(12) United States Patent
Falk

(10) Patent No.: US 8,942,131 B2
(45) Date of Patent: Jan. 27, 2015

(54) METHOD FOR FILTERING AND PROCESSING DATA IN A PACKET-SWITCHED COMMUNICATION NETWORK

(75) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 98 days.

(21) Appl. No.: 13/807,761

(22) PCT Filed: Jun. 8, 2011

(86) PCT No.: PCT/EP2011/059480
§ 371 (c)(1),
(2), (4) Date: Dec. 31, 2012

(87) PCT Pub. No.: WO2012/000753
PCT Pub. Date: Jan. 5, 2012

(65) Prior Publication Data
US 2013/0100848 A1    Apr. 25, 2013

(30) Foreign Application Priority Data
Jun. 30, 2010   (DE) .......................... 10 2010 025 638

(51) Int. Cl.
*H04L 1/00*    (2006.01)
*H04L 12/26*   (2006.01)
(Continued)

(52) U.S. Cl.
CPC ............. *H04W 12/00* (2013.01); *H04L 43/028* (2013.01); *H04L 47/22* (2013.01); *H04L 63/0227* (2013.01); *H04L 47/14* (2013.01); *H04L 47/19* (2013.01); *H04W 12/12* (2013.01)
USPC ........................................................ 370/252

(58) Field of Classification Search
CPC .............................. H04W 12/00; H04W 12/12
USPC .......................................................... 370/252
See application file for complete search history.

(56) References Cited

U.S. PATENT DOCUMENTS

| | | |
|---|---|---|
| 7,574,202 B1 | 8/2009 | Tsao et al. |
| 2003/0186679 A1 | 10/2003 | Challener et al. |
| 2003/0216144 A1 | 11/2003 | Roese et al. |
| 2004/0252837 A1 | 12/2004 | Harvey et al. |

(Continued)

OTHER PUBLICATIONS

Wullems, C., et al., "Proximity-Based Network Packet Filtering for IEEE 802.11 Wireless Devices", Proceedings of the IADIS (International Association for Development of the Information Society) International Conference, 2004, pp. 254-261, Lisbon, Portugal, URL: http://www.iadis.net/dl/final_uploads/200401L032.pdf.

*Primary Examiner* — Mark Rinehart
*Assistant Examiner* — Maharishi Khirodhar
(74) *Attorney, Agent, or Firm* — Laurence A. Greenberg; Werner H. Stemer; Ralph E. Locher

(57) ABSTRACT

A method processes data in a packet-switched communication network having a plurality of network nodes, between which data packets are transmitted. Information contained in one data packet is extracted therefrom, the packet being received in a network node. One physical transmission parameter of the received data packet is ascertained, the physical transmission parameter specifies or is dependent on one property of the physical transmission of the received data packet. The received data packet is filtered based on a rule set, taking into account some of the extracted information and part of the physical transmission parameter, and further processed dependant on the filtering. An application of the method is "bootstrapping", wherein network nodes are configured, cryptographic information being transmitted in the context of the configuration. A plausibility test of physical transmission parameters of the data packets that are transmitted during bootstrapping can ascertain whether an attacker is manipulating the bootstrapping process.

22 Claims, 4 Drawing Sheets

(51) Int. Cl.
*H04W 12/00* (2009.01)
*H04L 12/815* (2013.01)
*H04L 29/06* (2006.01)
*H04L 12/801* (2013.01)
*H04W 12/12* (2009.01)

(56) References Cited

U.S. PATENT DOCUMENTS

2007/0025245 A1\* 2/2007 Porras et al. .................. 370/229
2010/0131751 A1 5/2010 Reznik et al.

\* cited by examiner

METHOD FOR FILTERING AND PROCESSING DATA IN A PACKET-SWITCHED COMMUNICATION NETWORK

BACKGROUND OF THE INVENTION

FIELD OF THE INVENTION

The invention relates to a method for processing data in a packet-switched communication network, especially a wireless communication network, having a plurality of network nodes between which data packets are transmitted. The invention relates further to a corresponding communication network and a corresponding network node.

In order to protect network nodes in a packet-switched communication network from undesired and/or manipulated data packets, it is known from the prior art how to filter data packets in a suitable manner, for example with the aid of what is termed a firewall. A firewall for that purpose analyzes protocol fields of a received data packet and the data packets will not for example be forwarded unless the contents of the protocol fields, based on predefined criteria, are recognized as being permitted.

It is further known from the prior art how to cryptographically protect data packets transmitted in a packet-switched data network for example by encrypting the useful data in the data packets by means of a suitable key. The data packets' and/or header fields' intactness can therein be safeguarded by a cryptographic checksum using the cryptographic key, with only data packets having a valid checksum being processed further.

Furthermore known from the prior art are what are termed intrusion-detection systems that are employed in, for example, WLAN systems for monitoring the wireless communication and identifying undesired communication.

Within the scope of a communication process in a packet-switched communication network, the individual network nodes are as a rule identified by means of corresponding addresses such as, for example, the MAC address in layer 2 and/or the IP address in layer 3 of the OSI reference model. However, approaches are also known in the case of which send nodes are identified in a WLAN network based on what is termed WLAN fingerprinting. A send node can therein be identified on the basis of measured characteristics of its physical transmission signal. In particular the transient occurring when a send node is switched on is evaluated. The measuring effort required for analyzing the transient is, however, considerable and reliable identifying of a send node cannot always be achieved.

The known methods for filtering and/or protecting data packets are based on the principle that the information contained in the data packets is analyzed and/or encrypted. It is, though, desirable in certain scenarios to detect unauthorized manipulating also on the basis of criteria other than the information contained in the data packets, for example when cryptographic keys are transmitted within the scope of a communication process that is not cryptographically safeguarded.

BRIEF SUMMARY OF THE INVENTION

The object of the invention is therefore to provide a method for processing data in a packet-switched communication network in the case of which method data packets are analyzed not exclusively on the basis of the information contained in the data packets.

Said object is achieved by means of the method as claimed in claim 1 and/or the packet-switched communication network as claimed in claim 18 and/or the network node as claimed in claim 19. Developments of the invention are defined in the dependent claims.

The inventive method serves to process data in a packet-switched communication network, especially a wireless communication network, having a plurality of network nodes between which data packets are transmitted. Within the scope of the method, the information contained in one or more data packets received in one or more network nodes in the communication network is at least partially extracted from said packets. One or more physical transmission parameters of the received data packet(s) are further ascertained, with the physical transmission parameter(s) specifying or being dependent on one or more characteristics of the physical transmission of the received data packet(s). The term "physical transmission parameters" has a broad scope within the meaning of the invention and can encompass any parameters that are connected with the data packets' transmission, in particular also parameters relating to transmitting and to receiving the data packets, with it being possible for the physical transmission parameters also to be embodied such as to relate only indirectly to characteristics of the physical transmission.

Within the scope of the inventive method the received data packet(s) is/are filtered on the basis of a set of rules (also a single rule) and processed further as a function of the filtering process, with the set of rules taking account of at least a part of the extracted information and at least a part of the ascertained physical transmission parameter(s) of the received data packet(s). The term "filtering" has a broad scope within the meaning of the invention and encompasses in particular any kind of suitable specifying and/or categorizing of data packets, with their being correspondingly processed further as a function of said specifying and/or categorizing.

The inventive method is characterized in that physical transmission parameters are also used in the filtering of data packets alongside information contained in the data packets. In contrast to WLAN fingerprinting mentioned in the introduction, no attempt is therein made to identify a network node on the basis of its transmission characteristics; instead, data packets are filtered using physical transmission parameters in order, for instance, to ascertain whether a plurality of successive data packets' transmission parameters are plausible. For example it can be determined on the basis of a plausibility check whether the received data packets have originated in one and the same send node. That can be deduced in particular from whether specific transmission parameters of successive data packets remain constant or exhibit wide deviations. The received data packets can be, for example, rejected if such wide deviations occur. In the event of wide deviations it is also possible, for example, to cancel an automatic setup process for configuring a cryptographic key if such a setup process is being performed via the data packets.

In a preferred embodiment variant of the inventive method the information extracted from the data packets includes one or more of the following items:

One or more addresses and/or port numbers of a source-network node in which the received data packet(s) orginate(s) and/or one or more addresses and/or port numbers of a destination-network node for which the received data packet(s) is/are intended;

one or more transmission protocols employed for transmitting the received data packet(s).

The extracted information originates in particular in layer 2 and/or layer 3 and/or a higher layer of the OSI reference model situated above layer 3. For example the information can include the corresponding MAC addresses on layer 2 and/or the corresponding IP addresses on layer 3, as well as corresponding transmission protocols such as, for example, TCP, UDP, and the like. Within the meaning of the invention, a data packet therein relates also to a data frame on layer 2. A person skilled in the relevant art will be sufficiently familiar with the OSI reference model, which describes a packet-switched communication based on a layer model.

In another, particularly preferred embodiment variant the physical transmission parameter(s) ascertained within the scope of the inventive method include(s) one or more of the following parameters:

- The signal strength and/or signal-to-noise ratio with which the data packet(s) is/are received;
- one or more parameters of a demodulation unit that is adaptively matched to the transmission of the received data packets and by means of which the received data packet(s) is/are demodulated, in particular one or more parameters of a demodulation unit in a MIMO and/or RAKE receiver;
- the demodulation method(s) employed for the received data packet(s);
- the directional characteristic of the received data packet(s);
- the transmission rate of the received data packet(s);
- a measure of errors specifying the errors occurring during transmission of the received data packet(s).

The above-mentioned MIMO receiver is a receiver that is sufficiently well known from the prior art and which on the basis of the receive signals from a plurality of antennas demodulates the incoming high-frequency signal in which the data packets are contained. Predefined parameters that depend on the direction from which the signals are received are used within the scope of demodulating. The above-mentioned RAKE receiver is likewise known from the prior art. The demodulation parameters are suitably set in that receiver to take account of multipath propagating while the signals are being transmitted.

The above-mentioned measure of errors that specifies the errors occurring during transmission of the received data packet(s) can be determined, for example, within the scope of a forward error-correcting operation and therein indicate in particular the number of corrected bit errors.

In another, particularly preferred embodiment variant of the inventive method the received data packet(s) will as a function of filtering be processed further in one or more of the following ways:

- The received data packet(s) will be rejected;
- the received data packet(s) will be forwarded to one or more network nodes;
- the received data packet(s) will be classified, for example assigned to suitable QoS classes, with the classes being taken into account in such a way, for example, while the data packets are being processed further that a priority will be set for further processing the data packets.

The further processing of data packets can possibly also consist in feeding out information about the received data packet(s) to a user on a user interface, whereupon the user can possibly decide what is further to be done with the data packets, for example whether the data packets are to be forwarded to other network nodes or rejected.

In another, particularly preferred embodiment variant of the inventive method the received data packet(s) is/are through filtering first assigned to categories as a function of extracted information and then a check is performed to determine whether one or more ascertained physical transmission parameters of the received data packet(s) meet one or more reference criteria of the respective category to which the data packet(s) has/have been assigned.

In a particularly preferred embodiment variant a measure of the change in one or more physical transmission parameters is evaluated for a plurality of received data packets based on the reference criterion/criteria, with the reference criterion/criteria having been met in particular if the measure of the change is less than or less than or equal to a predefined threshold, with the received data packet(s) not meeting the reference criterion/criteria preferably being rejected. Via filtering, it can in that way be determined, for example, whether the received data packets always originate in the same send node. If they do not, there will be a risk that the data packets have been manipulated, whereupon the data packets will in a preferred variant of the invention be rejected. The measure of the change in the physical transmission parameters can have been defined on the basis of, for example, the physical transmission parameters' variance or standard deviation ascertained from the data packets and/or can correspond to the variance or standard deviation. The measure of the change can also be the physical transmission parameter's/parameters' maximum deviation from the mean value of the received data packets' physical transmission parameters, with a threshold for the maximum deviation being set in keeping with the reference criteria, with the data packets being, for example, rejected if the maximum deviation exceeds the threshold.

In another variant of the inventive method the reference criterion/criteria can be fixed, meaning that it/they does not/do not change while the method is being performed. It is, though, also possible for the reference criteria to have been matched to one or more ascertained physical transmission parameters of the received data packet(s).

The inventive method can be implemented at various locations within the communication network. The inventive method is in one variant performed at least partially in the network node(s) in which the data packet(s) is/are received. For data packets received in a plurality of predefined network nodes it is also possible for the method to be performed at least partially in a central network node assigned to the plurality of predefined network nodes. The central network node can therein be a network node that is not one of the predefined network nodes. It is also possible for the central network node to be one of the network nodes from the set of predefined network nodes.

In a particularly preferred embodiment variant of the inventive method the data packets received in one or more network nodes include configuration-data packets transmitted within the scope of a predefined configuration process, with one or more network nodes being configured through the predefined configuration process and in particular cryptographic information therein being exchanged. A preferred application of the inventive method is hence performing what is termed a bootstrapping operation where initial configuration data that is needed for ensuing communication between network nodes is loaded onto the network nodes. On the basis of one or more ascertained physical transmission parameters of the received configuration-data packet(s), a measure of confidence is therein ascertained that indicates the confidence that the received data packet(s) belong(s) to the predefined configuration process, which is to say that the configuration-data packets have in particular not been manipulated and/or are not being fed into the communication network by an unauthorized attacker. The configuration process will be canceled or interrupted within the scope of that variant of the invention if the measure of confidence represents a degree of confidence that is less than or less than or equal to a predefined minimum confidence. By way of corresponding information that is extracted from the data packet it can be determined according to that variant of the invention whether a data packet is a configuration-data packet.

In a particularly preferred embodiment variant the measure of confidence represents a degree of confidence that is greater the less the change in the one or more physical transmission parameters is for a plurality of received data packets. That means the degree of confidence will be all the greater the higher the probability is that the configuration-data packets are always transmitted from the same network node.

The measure of confidence will in a variant of the invention be fed out to a user on a user interface if a configuration process is interrupted, with the user being able via the user interface to specify resuming or canceling the configuration process. In another embodiment the received configuration-data packet(s) will not be assigned to the predefined configuration process unless the one or more physical transmission parameters, in particular the signal strength, of the received configuration-data packet(s) are within one or more predefined value ranges. On the basis of said embodiment variant it is therein possible to achieve (further) coding of the configuration-data packets in a suitable manner using correspondingly established value ranges for the physical transmission parameters.

In another embodiment variant of the inventive method a predefined configuration process is initiated by one or more first configuration-data packets transmitted having a first signal strength by one or more network nodes, with network nodes that receive said first configuration-data packets not launching any further configuration processes. It will in that way be ensured that only a single configuration process is ever performed at a particular instant. In another, preferred embodiment variant the predefined configuration process is performed using one or more second configuration-data packets transmitted having a second signal strength less than the first signal strength by one or more network nodes. It will be ensured thereby that the configuration parameters that are transmitted within the scope of configuring and can in particular also contain cryptographic keys can be received only in a small segment of a wireless communication network, as a result of which the possibility of attacks critical to security will be limited.

The method just described can be employed in any kinds of communication networks. In a particularly preferred embodiment variant the method is used in a communication network of an automation system in which manufacturing and/or production flows are implemented and in particular controlled and/or monitored with the aid of the communication network.

Alongside the method just described, the invention relates further to a packet-switched communication network, especially a wireless communication network, having a plurality of network nodes between which data packets are transmitted while the communication network is operating, with the communication network being embodied such that the inventive method and/or one or more of the above-described variants of the inventive method can be implemented in the communication network.

The invention furthermore encompasses a network node for use in an inventive packet-switched communication network. The network node therein contains a first means by which the information contained in one or more data packets received in one or more network nodes in the communication network is at least partially extracted from said packets while the network node is operating. Further provided is a second means by which one or more physical transmission parameters of the received data packet(s) are ascertained while the network node is operating, with the physical transmission parameter(s) specifying or being dependent on one or more characteristics of the physical transmission of the received data packet(s). A third means is furthermore provided by means of which the received data packet(s) is/are filtered on the basis of a set of rules taking account of at least a part of the extracted information and at least a part of the ascertained physical transmission parameters while the network node is operating and processed further as a function of the filtering process.

Exemplary embodiments of the invention are described in detail below with the aid of the attached figures, in which:

DESCRIPTION OF THE INVENTION

The embodiment variants of the inventive method that are described below are based on ascertaining physical transmission parameters relating to the data packets received in one or more network nodes of a communication network, with said parameters also being taken into account when the data packets are being filtered and processed further. Before the invention is described in detail it will first be shown in what kinds of networks the inventive method can be employed. All the networks described in the following therein relate to packet-switched networks that transmit frames and/or data packets based on the various layers of the OSI reference model, with the term "frame", which is employed in particular on layer 2 of the OSI reference model, being an embodiment variant of a data packet within the meaning of the invention.

Figure 1:
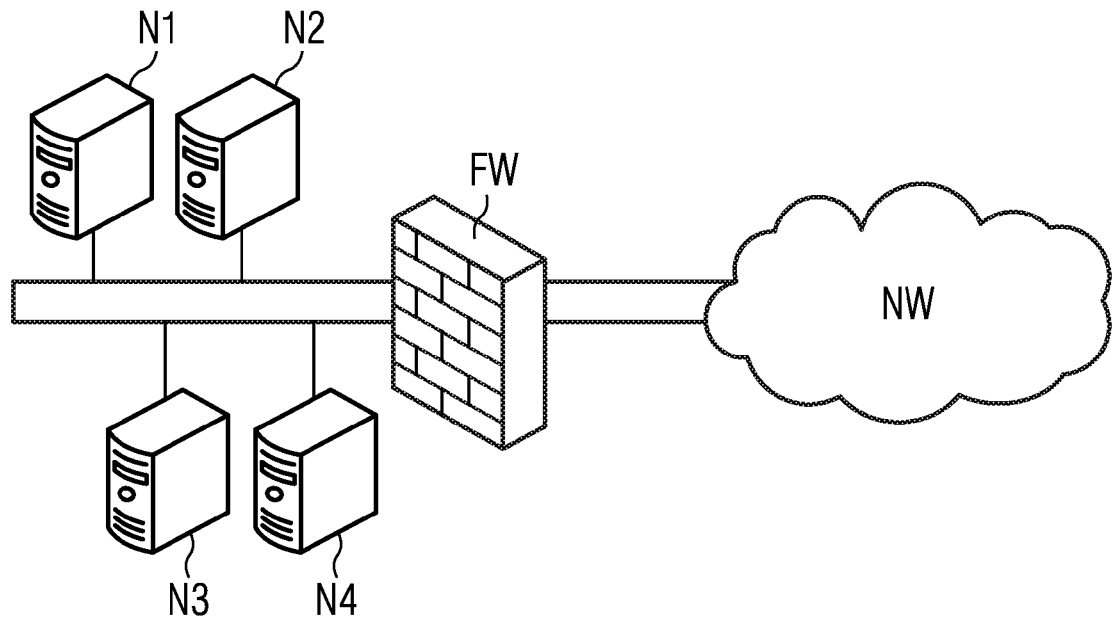
FIGS. 1 to 5 show different topologies of networks in which the inventive method can be employed.

FIG. 1 shows a first variant of a wired communication network comprising network nodes N1, N2, N3, N4 and what is termed a firewall FW. Within the meaning of the invention the firewall therein also constitutes a network node in the data network and filters data packets arriving at the firewall from an external network NW and/or are to be forwarded from the communication network to the external network NW. In the embodiment variant shown in FIG. 1, the inventive filtering and further processing of data packets are based on a packet filter that is integrated in the firewall FW and which decides as a function of the received data packets' transmission parameters such as, for example, the signal level or the transmission methods used, whether a data packet will be forwarded.

Figure 2:
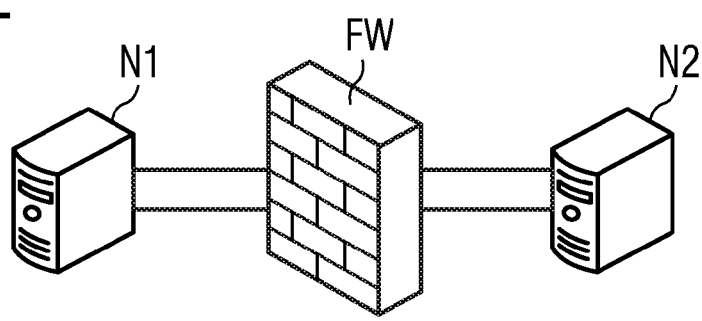

FIG. 2 shows a special case of the network shown in FIG. 1, in which the inventive filter function has only been realized between two network nodes N1 and N2 in the form of corresponding computers that mutually exchange data over a point-to-point connection. The filter function is therein in turn integrated in a corresponding firewall FW between computers N1 and N2.

Figure 3:
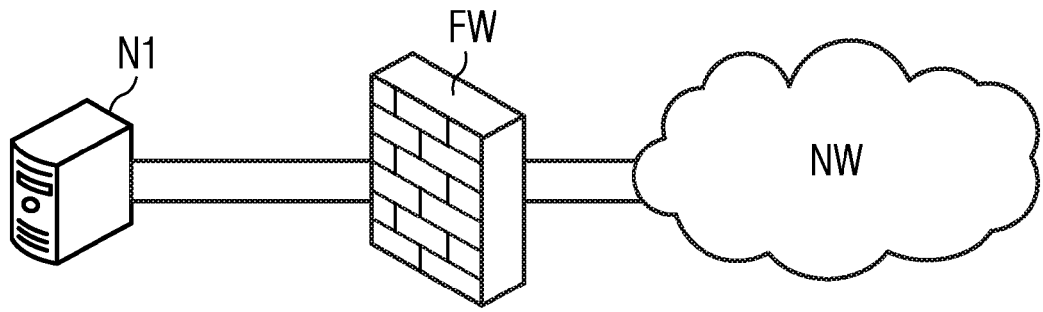

FIG. 3 shows another special case of a network shown in FIG. 1, in which the corresponding filter function is provided in what is termed a personal firewall FW in the case of which a single network node N1 communicates with a network NW via the firewall. It is therein possible for the firewall not to form a separate network node but instead to be an integral constituent of network node N1.

Figure 4:
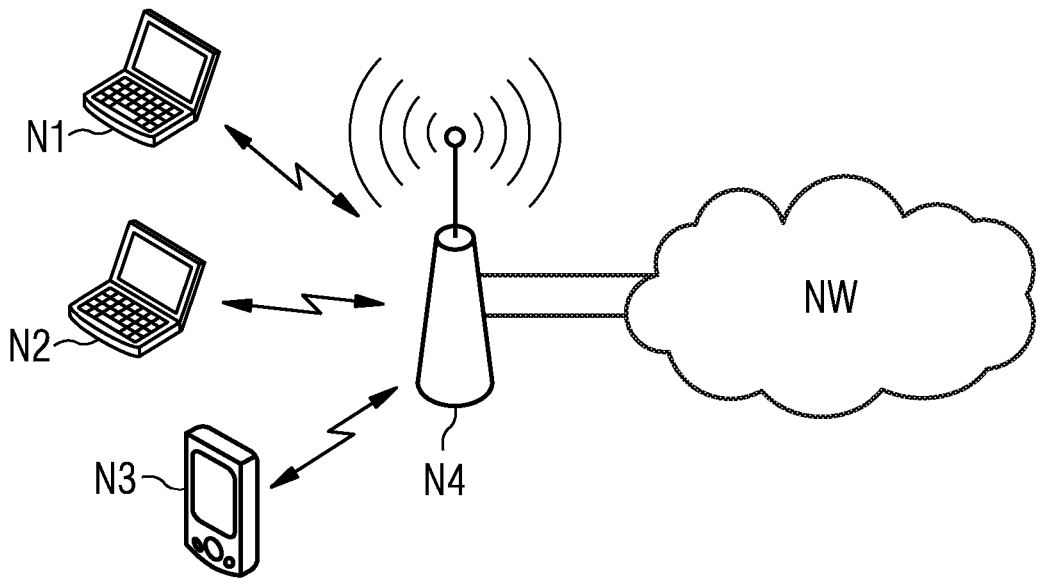

FIG. 4 shows another embodiment variant of a network in which the inventive method can be implemented. The network is here a wireless communication network based on a WLAN, for example, in the case of which three network nodes N1, N2, and N3 communicate wirelessly in the form of corresponding terminals with another network node N4 that is the access point for the WLAN network. Network nodes N1 to N3 are connected to an external network NW via said access point N4. Terminals N1 and N2 are laptops in the scenario shown in FIG. 4, whereas terminal N3 is a PDA (PDA=Personal Digital Assistant). The inventive filter function which takes account of transmission parameters of the data packets is integrated in access point N4 in the scenario shown in FIG. 4.

Figure 5:
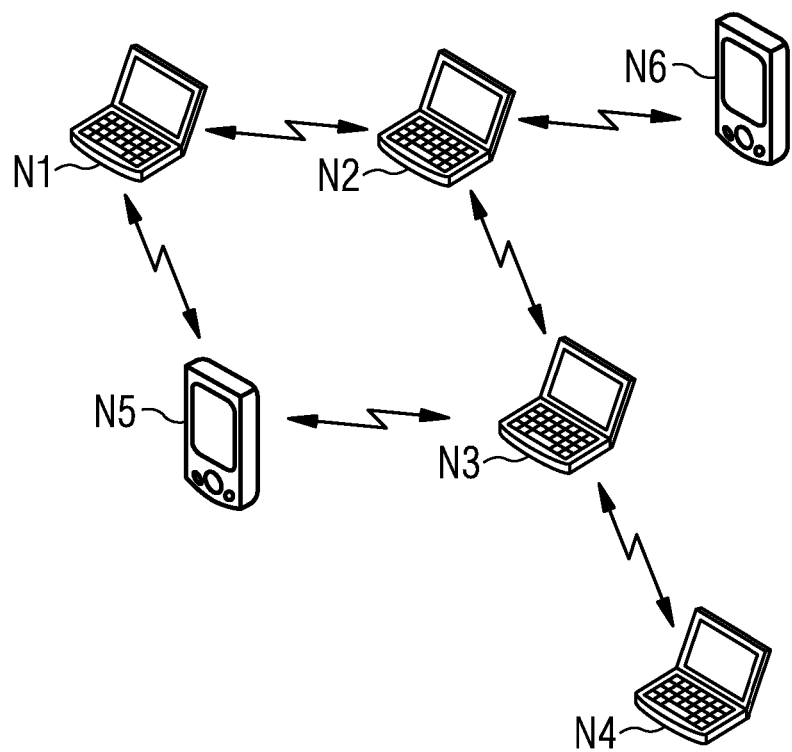

FIG. 5 shows another type of network in which a filter function based on the inventive method is integrated in the individual network nodes on a decentralized basis. The network shown in FIG. 5 is therein a wireless and non-centralized multi-hop network in the case of which individual network nodes N1, N2, ..., N6 are interconnected via a mesh network (for example a WLAN mesh network or ZigBee sensor network). The network nodes are in turn corresponding terminals having a wireless communication interface, with network nodes N1 to N4 being represented as laptops and network nodes N5 and N6 being shown as PDAs. The inventive filter function is integrated in each of the individual terminals in the scenario shown in FIG. 5, meaning there is no predefined network node that performs filtering of the data for a plurality of network nodes.

Based on the above network topologies, it is possible to realize embodiment variants of the invention in the case of which the transmission parameters of data packets that are received in parallel in a plurality of network nodes are taken into account during filtering. If a data packet is received, for instance, from a first network node, then another, second network node that also receives the data packet will be able to transmit the data packets' transmission parameters ascertained by it to the first network node. On the basis of the transmission parameters it itself has ascertained as well as the second network node's transmission parameters, said first network node will then be able to decide how the data packet it has received is to be processed further.

An embodiment variant of the inventive method is described below with the aid of the flowchart shown in FIG. 6, with it being assumed that in this variant the inventive steps are performed in a single network node, for example a firewall. The start of the method is therein specified in FIG. 6 by step S1. Within the scope of the method, data packets are received in the corresponding network node as has been indicated by step S2. Receive parameters are ascertained at step S3 for the received data packets in the form of physical transmission parameters that specify characteristics of the data packets' physical transmission and/or depend on said characteristics. Said receive parameters therefore constitute information that is not contained in the data packets themselves but is instead ascertained by other means, for example by way of suitable measurements. Further to the physical transmission parameters' being determined, at step S4 the data packets are decoded in a manner known per se in order to extract the information contained therein.

The respective decoded data packets and the physical transmission parameters assigned to the respective data packets are finally stored at step S5. The information that is relevant within the scope of ensuing filtering of the data packets is then extracted from the data packets' decoded information at step S6. The extracted information therein includes in particular header fields of the data packets such as the send MAC address, receive MAC address, send IP address, receive IP address, transmission protocol used (for example TCP or UDP), port number of the send node and/or port number of the receive node, and the like. Together with the physical transmission parameters the extracted information is then finally filtered at step S7 on the basis of a set of rules (referred to also as a policy). What is therein essential to the invention is that not only decoded information of the data packets but also physical transmission parameters of the data packets are taken into account in the set of rules. The set of rules therein establishes in a suitable manner the criteria according to which a data packet is classified as permitted and/or non-permitted in keeping with the decoded information and physical transmission parameters.

Figure 6:
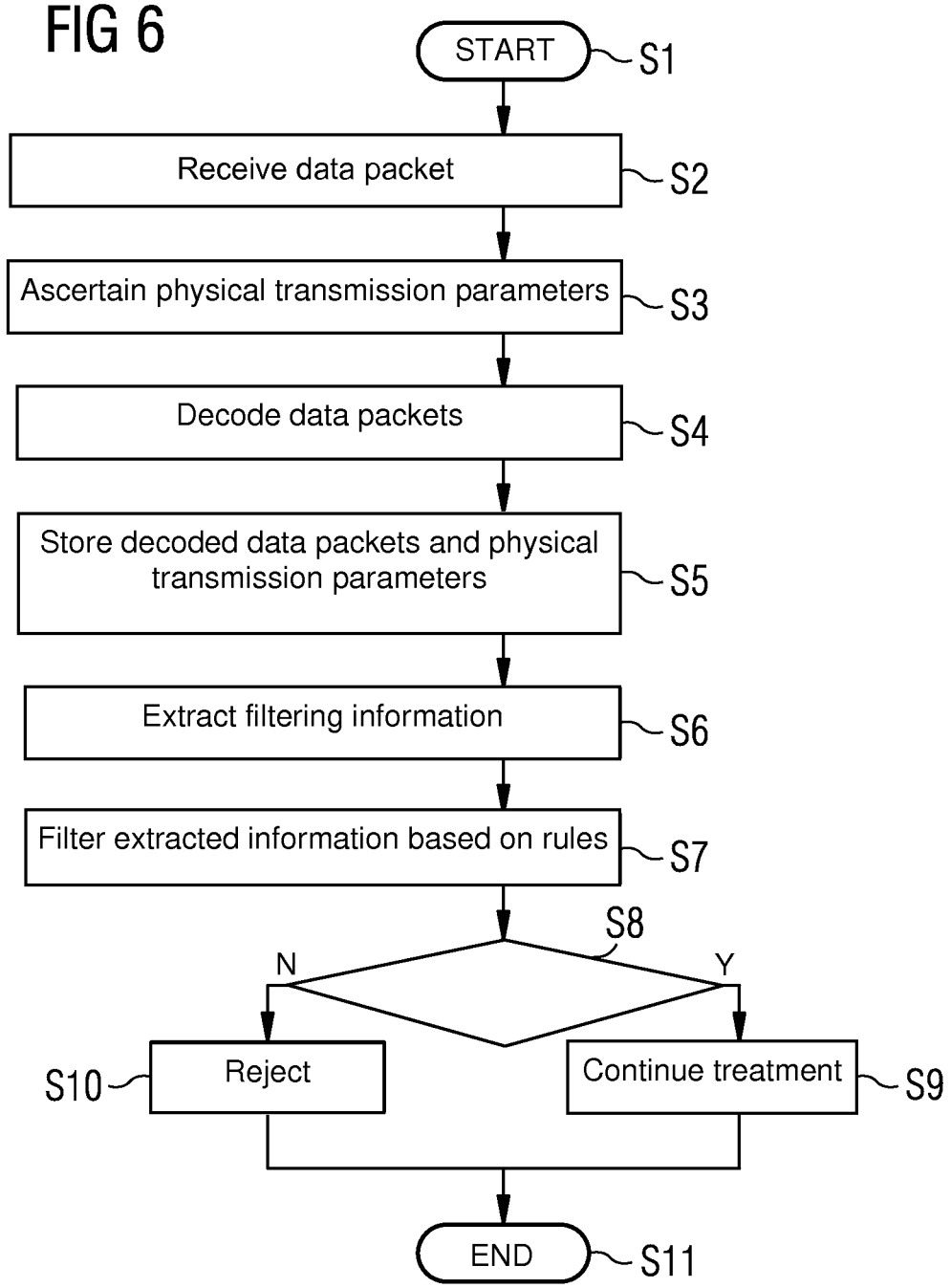
FIG. 6 is a flowchart illustrating the steps performed in an embodiment variant of the inventive method.

Step S8 in FIG. 6 elucidates the check performed to determine whether, according to the set of rules, a data packet is permitted (Y branch) or not permitted (N branch). A data packet that is permitted will be treated in accordance with step S9, meaning in particular that it will be forwarded to another network node. If the relevant data packet is not permitted, then it will be rejected in keeping with step S10 and not forwarded to another network node. The end of the method is therein indicated in FIG. 6 by step S11.

The above-mentioned set of rules can be embodied as, for example, a list of rules, with two examples of rules being given below whose syntax is based on that of routers from the company Cisco®:

permit 0.0.0.0 192.15.14.1 TCP src>=1024 dst=25
    RSS>=10 SNR<5 deny 0.0.0.0 192.15.14.1 TCP
    src=25 dst>=1024 RSS<5

By means of the rule introduced with "permit" it is specified under what conditions a data packet is permitted. The parameters that follow "permit" therein denote a source IP address 0.0.0.0, a destination IP address 192.15.14.1, and the transmission protocol TCP. It is further specified that a port number src of the source node is greater than or equal to 1024 and a port number dst of a receive node is 25. It is further established that the received signal strength RSS in a correspondingly established unit is greater than and/or equal to 10 and that the signal-to-noise ratio SNR, again in a correspondingly established unit, is smaller than 5. According to said rule introduced with "permit", all data packets that have the source IP address 0.0.0.0 and destination IP address 192.15.14.1 and which furthermore employ the TCP protocol and have a source port number greater than or equal to 1024 and a destination port number that is 25 will be permitted during filtering provided the other criterion has been met, namely that the data packet's receive-signal strength is greater than or equal to 10 and the data packet's signal-to-noise ratio is smaller than 5. The receive-signal strength and signal-to-noise ratio are therein examples of physical transmission parameters within the meaning of the invention. The receive-signal strength can be measured in, for example, dbµ, which is a logarithmic measure in decibels with respect to a reference value of 1 µV. The signal-to-noise ratio can by contrast be measured purely in dB. Data packets meeting the criteria contained in the "permit" rule will be permitted and for example forwarded to other network nodes.

The structure of the above rule specified by the command "deny" is analogous to that of the "permit" rule. The "deny" rule in particular contains the source IP address 0.0.0.0, the destination IP address 192.15.14.1, and the transmission protocol TCP, with a fixed source port number of 25 now being specified in contrast to the rule introduced with "permit", whereas the destination port number is specified by the value range greater than or equal to 1024. The receive-signal strength and no signal-to-noise ratio is moreover given as a further criterion in the "deny" rule. Data packets meeting the criteria contained in the "deny" rule will therein be rejected by the inventive filtering and not forwarded.

Figure 7:
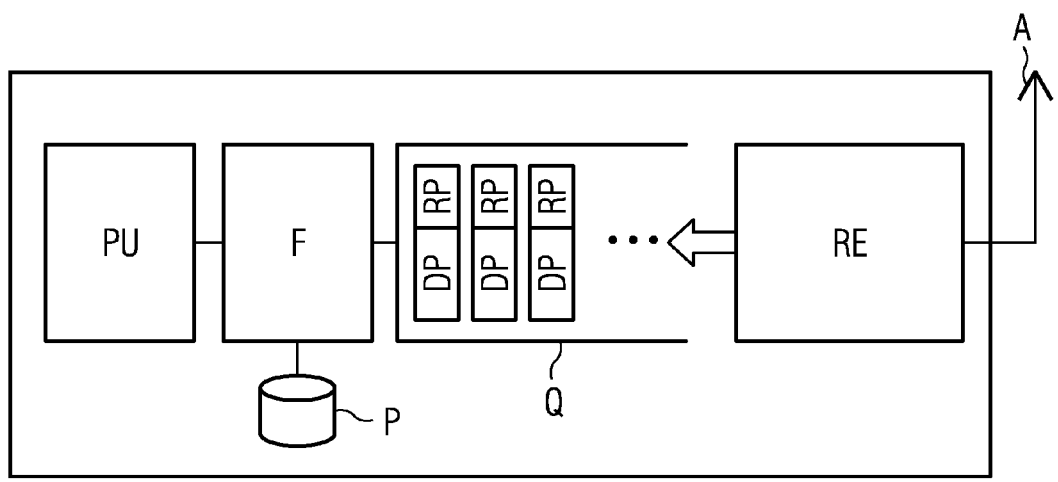
FIG. 7 shows the structure of a network node that filters and processes data packets according to an embodiment variant of the invention.

FIG. 7 is a schematic showing the structure of a network node in a wireless communication network, which node contains the inventive filter function. The network node includes a radio receiver RE which is able to receive data packets wirelessly via an antenna A. The radio receiver demodulates and decodes the high-frequency signal received via antenna A to obtain therefrom the received data packets DP with the information contained therein. For each received data packet, receiver RE furthermore ascertains and/or measures physical transmission parameters of the respective data packet, which parameters are identified by RP in FIG. 7. Data packets DP and/or the data packets' decoded information and transmission parameters RP are assigned to each other and filed together in a queue identified in FIG. 7 by Q. The data packets are then filtered in a corresponding filter unit F which analyzes the information in data packets DP as well as physical transmission parameters RP and decides as a function of a set of rules identified in FIG. 7 by P (P=policy) whether a respective data packet will be fed to another processing unit PU or rejected. Depending on how the set of rules is specifically embodied, processing unit PU can further process the data packets as a function of the information in the data packet and of the physical transmission parameters. For example the data packets that meet a first criterion can be forwarded to other network nodes via a second network interface. The information contained in the data packet and/or the corresponding data packet's physical transmission parameters can also be displayed on a user interface if the data packet meets a second criterion.

A special variant of the inventive method based on what is termed inband bootstrapping is explained below. What is understood by the term "bootstrapping" is the automatic configuring of a network node in a communication network with the aid of another network node and/or the reciprocal configuring of two network nodes in the communication network. Configuring in particular comprises setting up a communication state between the network nodes, with as a rule one or more cryptographic keys being exchanged within the scope of this operation for safeguarding subsequent communication. The term "inband bootstrapping" therein means that the keys and/or the cryptographic information for computing the keys are/is transmitted over the same communication interface which, after configuring, is also used for transmitting data and will then have been safeguarded by means of the cryptographic key(s).

It has proved problematic within the scope of conventional bootstrapping that the communication employed for transmitting the keys is as a rule not or only poorly cryptographically protected so that an attacker may find an opportunity to access the transmitted keys so as then to be able to make unauthorized use of the communication interface that has been set up and/or eavesdrop on data being transmitted on said interface. Protection against attackers is conventionally achieved within the scope of the bootstrapping operation through said operation being able to be performed only within a predefined short time window, for example only within a period of time after the pressing of a button on the relevant network nodes between which bootstrapping is carried out. To further enhance the security of the bootstrapping operation it is furthermore known that it is performed in a protected, controlled environment in which certain attacks by unauthorized third parties can be assumed to be virtually precluded.

The security of the bootstrapping operation can within the scope of the embodiment variant described below be enhanced in a different way and without using a protected environment. That is done by taking account within the scope of bootstrapping not only of information within the data packets transmitted during bootstrapping but also of physical transmission parameters of said data packets. Within the scope of the embodiment variant of bootstrapping described here, first bootstrapping-data packets are initially transmitted with a high output power for initiating the bootstrapping operation, and are also received by the network nodes with a high signal strength. From the information in the data packets as well as possibly a rule that the data packets' signal strength has to exceed a predefined threshold, the network nodes in the communication network will then detect that a bootstrapping operation is being initiated by another network node. The network nodes will in that case prohibit a further bootstrapping operation from being initiated in order to prevent a plurality of bootstrapping operations from being performed in parallel, which owing to the no longer clear assignment of configuration parameters will result in the already initiated bootstrapping operation being canceled.

When bootstrapping has been initiated, second bootstrapping-data packets containing the actual configuration data and in particular also a corresponding cryptographic key or a parameter for computing the cryptographic key will finally be sent out by a corresponding network node. Said second data packets will this time be transmitted with a very low output power because it is intended for the parameters in said data packets to be made known only within as small as possible an area in order thereby to enhance the level of protection from remote attackers. In the embodiment variant described here, said second data packets' signal strength is used for checking that the second bootstrapping-data packets also always originate in the same network node. A filtering operation is therein performed to the effect that bootstrapping will only be successfully concluded if second data packets within the scope of bootstrapping are always received with a constant signal strength. The bootstrapping operation will be canceled if data packets having substantially mutually differing signal strengths are detected during filtering. The security of bootstrapping will be enhanced according to the above embodiment variant because the data packets for a successful attack will have to be smuggled in by an attacker in such a way that the data packets' physical transmission parameters will be accepted by the recipient as valid.

In another variant of bootstrapping, specific signal strengths of the received second data packets can possibly also be used as a criterion for a bootstrapping operation being accepted as valid. For example within the scope of a corresponding set of rules it can be established which kinds of second data packets are to be received with a high signal strength and which kinds of second data packets are to be received with a low signal strength, with the information about what kind of data packet it is being contained in the data packet. Hence, according to said variant, in the case of a bootstrapping operation for which a sending network node is to use different signal powers for individual data packets, the receiving network node will be able to verify whether the sending network node has the expected signal-power characteristics that have in turn been established by way of corresponding rules. Bootstrapping will be canceled if the signal-power characteristics deviate from those that are expected because there is a risk of an attack by an unauthorized third party. For the above-described embodiment variants, instead of the signal strength it is also possible to use other parameters for verifying a bootstrapping operation such as, for example, the received data packets' directional characteristic or parameters of an adaptive demodulation unit matched to the transmission characteristics, and the like.

In a specific variant of above-described bootstrapping, two or possibly more than two successive bootstrapping-data packets are examined to determine how similar their transmission parameters are. For example the physical transmission parameters of all data packets received and/or observed during the bootstrapping operation are therein stored. The stored transmission parameters are analyzed at the end of the bootstrapping operation, for example a transmission parameter's maximum deviation, expressed as a percentage, from its mean value is determined. A measure of confidence lying within a value range of, for example, −1 to +1 can be derived therefrom. The higher the measure of confidence is, the higher the confidence in the bootstrapping operation will be in terms of its having been manipulated by a third party. For example the measure of confidence can be set to −1 if the bootstrapping-data packets' transmission parameters deviate a maximum of more than 50% from the mean value, whereas the measure of confidence will be assigned the value +1 if the bootstrapping-data packets' transmission parameters deviate less than 5% from the mean value. The measures of confidence will then be assigned linearly to intermediate values of between −1 and +1 for all intermediate maximum percentage deviations. The ascertained measure of confidence can then be compared with a threshold to verify the bootstrapping operation, which will be successfully concluded only if the threshold (for example 0.7) is exceeded, and otherwise rejected.

The ascertained measure of confidence can in another variant be displayed to a user on a user interface, whereupon the user can decide whether the bootstrapping operation is to be treated as having been successfully concluded. Bootstrapping will then be either successfully terminated or canceled, depending on the user's relevant input. The measure of confidence can therein be indicated to the user in the form of, for instance, a corresponding numerical value or on a color scale from green through amber to red. The ascertained measure of confidence can possibly also be assigned to the parameters set up within the scope of bootstrapping, particularly to the cryptographic key that has been set up. For example on the basis of the measure of confidence it is possible to specify for which actions a parameter and/or cryptographic key that has been set up is later able to be used. Thus, for instance, it will not be possible to perform a configuration modification that is critical to security unless the relevant instruction to modify the configuration is protected by a key for which a measure of confidence greater than 0.9 has been ascertained within the scope of bootstrapping. An interrogation of diagnostic values that is less critical to security can by contrast already be permitted when protected by a key whose measure of confidence within the scope of bootstrapping was greater than 0.3.

What is made possible by the above-described variants of bootstrapping is a check to determine whether at least the relevant bootstrapping-data packets are being transmitted in the same way. A bootstrapping operation will therefore not have been successfully completed unless having taken place under defined ambient conditions with no sudden, unexpected changes being observed in the transmission characteristics.

The inventive filtering of data packets can generally be used also for applications not concerned with security. For instance a network node in the form of an access point in a wireless network can only accept a logon message if, for example, a receive parameter such as the signal strength exceeds a threshold, whereas other messages such as, for example, logging off of an access point, handover, or useful-data transmission, will be accepted even in the event of poor parameters, for example low signal strength. Similarly, for example a less robust or data-intensive type of communication between network nodes can be permitted only if the physical transmission parameters are good. An error-prone transmission's use can hence be restricted on a protocol-specific basis, for example, so that only basic services will still be permitted if transmission conditions are poor. The services can also be appropriately prioritized and differentiated on the basis of their priorities. For example only safety-critical messages or realtime-critical data constituting high-priority data can be transmitted in the case of a wireless industrial-control means when the received data packets' transmission characteristics are poor. Less-important diagnostic data will by contrast be rejected within the scope of filtering when the transmission characteristics are poor.

The invention claimed is:

1. A method for processing data in a packet-switched communication network, including a wireless communication network, having a plurality of network nodes between which data packets are transmitted, which method comprises the steps of:
   extracting, at least partially, information contained in at least one received data packet received in at least one network node;
   ascertaining at least one physical transmission parameter of the received data packet, the physical transmission parameter specifying or being dependent on at least one characteristic of a physical transmission of the received data packet;
   filtering the received data packet on a basis of a set of rules that take at least a part of the information extracted and at least a part of the physical transmission parameter into account and processed further in dependence on a filtering process; and
   wherein the data packets received in the at least one network node include configuration-data packets transmitted within a scope of a predefined configuration process, with the at least one network node being configured through the predefined configuration process, with a measure of confidence therein being ascertained on a basis of the at least one physical transmission parameter of the configuration-data packets received, the measure of confidence indicating a confidence that the configuration-data packets received belong to the predefined configuration process, with the predefined configuration process being canceled or interrupted if the measure of confidence represents a degree of confidence that is less than or less than or equal to a predefined minimum confidence.

2. The method according to claim 1, wherein the information includes at least one of the following items:
   at least one of addresses or port numbers of a source-network node in which the received data packet originates;
   at least one of addresses or port numbers of a destination-network node for which the received data packet is intended; and
   at least one transmission protocol employed for transmitting the received data packet.

3. The method according to claim 1, wherein the information extracted originates in at least one of layer 2, layer 3 or a higher layer of an open system interconnection reference model.

4. The method according to claim 1, which further comprises forming the physical transmission parameter to include at least one of the following parameters:
- at least one of a signal strength or signal-to-noise ratio with which the received data packet is received;
- at least one parameter of a demodulation unit that is adaptively matched to the transmission of the received data packet and by means of which the received data packet is demodulated;
- demodulation methods employed for the received data packet;
- directional characteristic of the received data packet;
- a transmission rate of the received data packet; and
- a measure of errors specifying errors occurring during transmission of the received data packet.

5. The method according to claim 1, wherein the received data packet will as a function of the filtering be processed further in at least one of following ways:
- the received data packet will be rejected;
- the received data packet will be forwarded to the at least one network node;
- the received data packet will be classified; and
- the information about the received data packet will be fed out to a user on a user interface.

6. The method according to claim 1, wherein after the received data packet is through the filtering, performing the further steps of:
- assigning the received data packet to categories in dependence on the information; and
- subsequently performing a check to determine whether the at least one physical transmission parameter of the received data packet meets at least one reference criteria of a respective category to which the received data packet has been assigned.

7. The method according to claim 6, which further comprises evaluating a measure of a change in the at least one physical transmission parameter for a plurality of received data packets based on a reference criterion/criteria, with the reference criterion/criteria having been met in particular if the measure of the change is less than or less than or equal to a predefined threshold, with the received data packet not meeting the reference criterion/criteria preferably being rejected.

8. The method according to claim 7, which further comprises performing one of fixing the reference criterion/criteria or matching the reference criterion/criteria to the at least one physical transmission parameter of the received data packet.

9. The method according to claim 1, which further comprises performing the method at least partially in the network node in which the received data packet is received.

10. The method according to claim 1, which further comprises performing the method, for data packets received in a plurality of predefined network nodes, at least partially in a central network node assigned to the plurality of predefined network nodes.

11. The method according to claim 1, wherein cryptographic information is exchanged during the predefined configuration process.

12. The method according to claim 11, wherein the measure of confidence represents a degree of confidence, wherein the degree of confidence is high if few changes in the at least one physical transmission parameter occur for a plurality of received data packets and the degree of confidence is low if many changes in the at least one physical transmission packet occur for the plurality of received data packets.

13. The method according to claim 11, which further comprises feeding out the measure of confidence to a user on a user interface if the predefined configuration process is interrupted, with the user being able to specify resuming or canceling the predefined configuration process via the user interface.

14. The method according to claim 11, wherein the configuration-data packets will not be assigned to the predefined configuration process unless the at least one physical transmission parameter of the configuration-data packets are within at least one predefined value range.

15. The method according to claim 11, wherein the predefined configuration process is initiated by first configuration-data packets transmitted having a first signal strength by the at least one network node, with network nodes, that receive the first configuration-data packets not launching any further configuration processes.

16. The method according to claim 15, which further comprises performing the predefined configuration process using at least one second configuration-data packet transmitted having a second signal strength less than the first signal strength by the at least one network node.

17. The method according to claim 1, which further comprises performing the method in a communication network of an automation system.

18. The method according to claim 4, wherein the at least one parameter of the demodulation unit is for at least one of a MIMO or a RAKE receiver.

19. The method according to claim 14, wherein the at least one physical transmission parameter is signal strength.

20. A packet-switched communication network, comprising:
- a plurality of network nodes between which data packets are transmitted while the packet-switched communication network is operating, with the packet-switched communication network programmed to perform a method for processing data in the packet-switched communication network, which method comprises the steps of:
- extracting, at least partially, information contained in the data packets received in the network nodes;
- ascertaining physical transmission parameters of the data packets, the physical transmission parameters specifying or being dependent on at least one characteristic of a physical transmission of the data packets;
- filtering the data packets on a basis of a set of rules that take at least a part of the information extracted and at least a part of the physical transmission parameters into account and processed further in dependence on a filtering process; and
- wherein the data packets received in the network nodes include configuration-data packets transmitted within a scope of a predefined configuration process, with the network nodes being configured through the predefined configuration process, with a measure of confidence therein being ascertained on a basis of the at least one physical transmission parameter of the configuration-data packets received, the measure of confidence indicating a confidence that the configuration-data packets received belong to the predefined configuration process, with the predefined configuration process being canceled or interrupted if the measure of confidence represents a degree of confidence that is less than or less than or equal to a predefined minimum confidence.

21. The packet-switched communication network according to claim 20, wherein the packet-switched communication network is a wireless communication network.

22. A network node for use in a communication network, the network node comprising:
- a radio receiver;
- a filter connected to said radio receiver;
- a processing unit connected to said filter;
- the network node programmed to:
  - extract information contained in data packets received in the network node in the communication network from the data packets while the network node is operating;
  - ascertain at least one physical transmission parameter of the data packets while the network node is operating, with the physical transmission parameter specifying or being dependent on at least one characteristics of a physical transmission of the data packets;
  - filter the data packets on a basis of a set of rules taking account of at least a part of the information extracted and at least a part of the physical transmission parameter while the network node is operating and processed further in dependence on a filtering process; and
- wherein the data packets received in the network node include configuration-data packets transmitted within a scope of a predefined configuration process, with the network node being configured through the predefined configuration process, with a measure of confidence therein being ascertained on a basis of the at least one physical transmission parameter of the configuration-data packets received, the measure of confidence indicating a confidence that the configuration-data packets received belong to the predefined configuration process, with the predefined configuration process being canceled or interrupted if the measure of confidence represents a degree of confidence that is less than or less than or equal to a predefined minimum confidence.

* * * * *